(12) United States Patent
Peng

(10) Patent No.: US 7,508,846 B2
(45) Date of Patent: Mar. 24, 2009

(54) PHYSICAL CAPACITY AGGREGATION SYSTEM AND METHOD

(75) Inventor: Wang-Hsin Peng, Ottawa (CA)

(73) Assignee: Nortel Networks Ltd., St. Laurewl, Quebec (CA)

( * ) Notice: Subject to any disclaimer, the term of this patent is extended or adjusted under 35 U.S.C. 154(b) by 958 days.

(21) Appl. No.: 10/301,681

(22) Filed: Nov. 22, 2002

(65) Prior Publication Data
US 2004/0100958 A1  May 27, 2004

(51) Int. Cl.
*H04J 3/04* (2006.01)
*H04K 1/10* (2006.01)

(52) U.S. Cl. ............................. 370/536; 375/260
(58) Field of Classification Search ................ 370/536; 375/260
See application file for complete search history.

(56) References Cited

U.S. PATENT DOCUMENTS

| | | | | |
|---|---|---|---|---|
| 5,680,400 | A * | 10/1997 | York | 370/473 |
| 5,822,321 | A * | 10/1998 | Petersen et al. | 370/474 |
| 6,154,535 | A * | 11/2000 | Velamuri et al. | 379/211.01 |
| 6,195,354 | B1 | 2/2001 | Skalecki et al. | 270/394 |
| 6,226,608 | B1 * | 5/2001 | Fielder et al. | 704/229 |
| 6,556,573 | B1 * | 4/2003 | Kaaresoja | 370/395.64 |
| 6,819,658 | B1 * | 11/2004 | Agarwal et al. | 370/316 |
| 6,876,669 | B2 * | 4/2005 | Shalom | 370/468 |
| 2002/0105949 | A1 | 8/2002 | Shinomiya | 370/386 |
| 2002/0167921 | A1 * | 11/2002 | Vakil et al. | 370/331 |
| 2002/0174368 | A1 * | 11/2002 | Nishizaki | 713/201 |
| 2002/0176450 | A1 * | 11/2002 | Kong et al. | 370/539 |
| 2003/0053486 | A1 * | 3/2003 | Okamori | 370/474 |
| 2003/0058888 | A1 * | 3/2003 | Shinoda | 370/470 |
| 2003/0081582 | A1 * | 5/2003 | Jain et al. | 370/338 |
| 2007/0038753 | A1 * | 2/2007 | Jorgensen | 709/226 |

OTHER PUBLICATIONS

*The PPP Multilink Protocol (MP)*, Internet Engineering Task Force Request for Comments 1990, (Aug. 1996).
IEEE 802.17 RPR Working Group Meeting Minutes, Plenary Session, Jul. 9-13, 2001.

* cited by examiner

*Primary Examiner*—Firmin Backer
*Assistant Examiner*—Mohammad S Adhami
(74) *Attorney, Agent, or Firm*—Anderson Gorecki & Manaras LLP

(57) ABSTRACT

Provided is a method and apparatus for segmenting packets into cells of variable sizes in order to facilitate the parallel transport of data symbols common to a single packet through a composite medium made up of a number of lanes. According to the invention the method of segmenting packets results in cell sizes that efficiently use the available capacity and minimize the complexity of any additional apparatus required in the receivers used to reassemble the packets from the variable-sized cells. Additionally, the invention could be advantageously combined with the Generic Framing Procedure (GFP) as defined in ITU-T G.7041/Y.1303 that was ratified December 2001.

25 Claims, 5 Drawing Sheets

PHYSICAL CAPACITY AGGREGATION SYSTEM AND METHOD

FIELD OF THE INVENTION

This invention relates to the parallel transport of data common to a single packet across a composite medium made up of a number of separate lanes or channels.

BACKGROUND OF THE INVENTION

At the physical layer of a digital communication system, a transmitter transmits data over a medium (e.g. an optical fiber or an electrical back-plane) to a receiver. In many cases the medium simply defines a single lane or channel that is used as a pipeline to carry data grouped in packets from a transmitter to a receiver. In other words, a packet originating from a transmitter travels through a single channel to a receiver so that the data symbols of the packet arrive at the receiver sequentially.

Increasing the rate at which packets can be serially transmitted through an optical fiber, as a complete unbroken sequence of data symbols, is becoming more expensive due to the extraordinary effort and rising costs of producing serial interfaces that can support increasingly higher data rate transmission and reception. Thus, the full capacity of optical fibers, in terms of the amount of data that can be passed through them, is not always realized due to cost limitations. Consequently, this slows the development of technologies and services in associated and complementary fields.

One solution has been to use multiple physical media (or lanes) to form a composite medium (channel) rather than use only a single physical medium. In such a scheme, each lane of the composite channel may be a single optical fiber or a single well-delineated frequency band within a wideband of frequencies supported by a single optical fiber as is the case in a typical DWDM architecture. Alternatively, a lane may exist within one optical fiber that is in a bundle of optical fibers, in which each optical fiber in the bundle supports a set of well-delineated frequency bands within a wideband of frequencies.

Data common to a single packet or multiple packet of a single flow can be sent in parallel across the multiple lanes of the composite medium. Beneficially, because the data common to a single packet or flow is simultaneously moving in parallel across multiple lanes, the rate at which the segmented data traverses any given lane can be significantly slower than the rate required to serially send a whole unbroken packet(s) through a single channel (lane). In this way the multiple lanes form a composite channel that provides a high data rate, the high data rate achieved through the summation of a number of lower data rates corresponding to respective lanes contained within the composite medium. Additionally, standard practice and common teachings in the art imply that each lane is treated as a separate physical layer in the communication system despite the obvious fact that each lane contributes to a single composite channel for a single point-to-point link/span.

As an example of the above, an optical fiber supporting a single 10 Gbps channel may be replaced with four 2.5 Gbps channels operated in parallel. Each 2.5 Gbps channel may be realized as either a separate optical fiber or a single frequency band (channel) within a wideband of frequencies supported in a single optical fiber. This scheme theoretically maintains the desired capacity of the connection (10 Gbps), while enabling the use of less expensive serial interfaces for each of the four 2.5 Gbps channels. It should also be understood from this example that the use of multiple lanes also allows greater granularity in selecting the combined capacity for a connection.

However, the use of multiple lanes does raise some difficulties. An obvious difficulty is that transmission and reception equipment must be provided for each lane and all such equipment must be synchronized so that the multiple lanes operate in unison to provide a composite channel capable of supporting the desired capacity.

Moreover, because each lane is treated as a separate physical layer, a packet that is to be sent across the composite medium, must be separated into a number smaller segments so that the complete packet will arrive at the receiver in a time representative of the desired high data rate. The packet segments can not be made too small because the real-rate at which meaningful data traverses the composite medium will be significantly lowered as a result of the required synchronization information that is added (typically within a header) to each segment. On the other end of the spectrum, if the segments are too large issues such as jitter, buffering and the requirement for extensive complex data equalization between the lanes will become problematic. Clearly, at either end of the spectrum on this issue, the advantage of using multiple lanes significantly diminishes.

Another related issue is how to establish a procedure to keep track of the segments so that the packets can be correctly reassembled at the receiver, without adding too much costly overhead to each segment. Previous solutions to these problems involved dividing a packet into a number of smaller fixed-sized cells. However, this leads to what is commonly known as the "65-byte problem". Typically, the fixed-sized cells are chosen to have a payload capacity of 64 bytes (a number chosen to be compatible with a number of data processing and switching protocols). If packets are not evenly divisible by 64 (or whatever number is chosen to be the capacity of a cell's payload) then there will be a significant portion of the fixed-size cells transported through the composite channel that do not contain a high percentage of meaningful information (data). In fact, such cells may contain only small portions of meaningful information corresponding to the remainder of the packet not divisible by the size of the fixed-size cell. Thus, the available capacity of the link will not be efficiently used is and the real rate at which data traverses the composite channel will be much lower than the desired capacity that the system was hoped to provide.

Prior efforts to resolve this problem, for example Link Aggregation (LA), facilitate a system where complete packets are transmitted over one lane, employ a packet traffic director to determine which packet goes down which lane. However, to maintain packet transmission order the effectiveness of multiple lanes is now dependent on the decision criteria such as a destination and source address pair. Furthermore, to support large packet sizes this scheme induces large delays, requires unruly amounts of buffering at the receive-end and reduces the goal of achieving a high transmission rate with the use of multiple lanes. In fact, if a packet is to arrive at a receiver in a time representative of the desired high data rate, the lane on which the packet is sent would have to operate at the desired high data rate. Thus, a system based on LA would require costly serial interfaces if it is to provide a high data rate link. Another prior solution commonly known as the Link Capacity Adjustment Scheme (LCAS) employs the use of fixed synchronous envelopes. The envelopes are transmitted across the lanes periodically and the data symbols are interleaved among different envelopes. Generally, other prior solutions do not provide a flexible transport scheme because they retain the use of fixed-size data transport units (e.g. packets, cells, envelopes, etc.).

SUMMARY OF THE INVENTION

According to one aspect of the present invention, there is provided a method of transmitting in parallel data symbols common to a single packet having a packet size across a composite medium, the composite medium comprised of a plurality of separate lanes that connect a transmitter and a receiver, the method comprising: segmenting the packet into a plurality of variable sized transfer units; and transmitting the plurality of variable sized transfer units from the transmitter to the receiver on the plurality of separate lanes.

In some embodiments the method comprises adding a unique sequence number to each of the plurality of variable size transfer units prior to transmission.

In some embodiments segmenting the packet into a plurality of variable sized transfer units is done subject to a constraint that each transfer unit has a respective size between a minimum transfer unit size and a maximum transfer unit size.

In some embodiments segmenting the packet into a plurality of variable sized transfer units is done subject to a further constraint that a fewest possible number of transfer units are used.

In some embodiments segmenting the packet into a plurality of variable sized transfer units is done subject co the constraint that each transfer unit has a respective size between a minimum transfer unit size and a maximum transfer unit size and subject to the constraint that the fewest possible number of transfer units are used comprises: determining a nominal transfer unit size; determining a nominal number of transfer units according to: nominal number of transfer units equals integer part of (packet size/nominal transfer unit size); if the packet size can be accommodated by the nominal number of transfer units each with a respective size between the minimum transfer unit size and the maximum transfer unit size, segmenting the packet into the nominal number of transfer units; otherwise, segmenting the packet into the nominal number of transfer units plus at least one additional transfer unit, each transfer unit having a respective size between the minimum transfer unit size and the maximum transfer unit size.

In some embodiments the method further comprises determining the nominal transfer unit size as a function of link conditions of the composite medium. In some embodiments the nominal transfer unit size is selected to be either the minimum transfer unit size or the maximum transfer unit size.

In some embodiments transmitting the plurality of variable sized transfer units from the transmitter to the receiver on the plurality of separate lanes is done by distributing the transfer units in a round-robin fashion to the plurality of lanes.

In some embodiments the method further comprises receiving an indication that at least one of said plurality of lanes which lane(s) has experienced failure or degradation; wherein transmitting the plurality of variable sized transfer units from the transmitter to the receiver on the plurality of separate lanes is done only using working lanes of the plurality of separate lanes.

In some embodiments the method further comprises transmitting an idle pattern on the at least one of said plurality of lanes which lane(s) has experienced failure or degradation to enable fault recovery detection at a receiver.

In some embodiments the method further comprises transmitting the plurality of variable sized transfer units from the transmitter to the receiver on the plurality of separate lanes is done such that each of the plurality of separate lanes each carry respective signals that are of varying rates in relation to one another, the method further comprising adjusting the respective varying rates have been adjusted to compensate for delay induced by the size of the packet.

In some embodiments each transfer unit is defined with a frame structure comprising: i) a Payload Length indicator field (PLI); ii) a Core Header Error Control (cHEC) field; iii) a sequence number field; iv) a sequence number Header Error Control (sHEC) field; v) a transfer unit payload (TUP) field into which a segment (i.e. grouping of data symbols) of the single packet is copied; and vi) a transfer unit Error Control (tuCRC) field.

In some embodiments the cHEC field contains a CRC-16 error control code, and the CRC-16 error control code is applied to the PLI field.

In some embodiments the sHEC field contains a CRC-16 error control code, and the CRC-16 error control code is applied to the sequence number field.

In some embodiments the tuCRC field contains a CRC-32 error control code, and the CRC-32 error control code is applied to the TUP field.

In some embodiments each sequence number field is comprised of a packet number, a transfer unit indicia, and a lane number.

In some embodiments each sequence number field is further comprised of a time stamp field, the time stamp field containing a value indicating the time a particular transfer unit was transmitted.

In some embodiments each sequence number field is further comprised of a header extension field.

In some embodiments the packet number is a four-byte number unique to the single packet.

In some embodiments the transfer unit indicia comprises two five-bit numbers $N_f$ and $M_f$, wherein $N_f$ represents transfer unit number $N_f$ of $M_f$, wherein $M_f$ is a total number of transfer units derived from the single packet.

In some embodiments segmenting the packet into a plurality of variable sized transfer units is done subject to the constraint that each transfer unit has a respective size between a minimum transfer unit size and a maximum transfer unit size and subject to the constraint that the fewest possible number of transfer units are used comprises: i) setting values TU_min and TU_max, the value TU_min being the minimum size of a transfer unit and the value TU_max being the maximum size of a transfer unit; ii) setting the nominal transfer unit size, TU_base_size depending upon the condition of the composite medium; iii) calculating a minimum number of transfer units; iv) calculating a remaining number of data symbols for the packet that do not fit into the minimum number of transfer units calculated in step iii); v) if the remaining number of data symbols is greater than zero distributing the remaining data symbols amongst the minimum number of transfer units calculated in step iii) if there is room to do so without increasing any transfer unit beyond TU_max; vi) if the remaining number of data symbols is greater than zero and there is not room to distribute the remaining data symbols amongst the minimum number of transfer units calculated in step iii), defining at least one additional transfer unit above the minimum number of transfer units calculated in step iii) and distributing the entire packet over the minimum number of transfer units and the additional transfer units such that each transfer unit is at least as large as TU_min and no larger than TU_max; vii) adding a unique sequence number to each of the transfer units into which the packet has been segmented.

According to another aspect of the present invention, there is provided a method of receiving a packet transferred in a plurality of variable size transfer units from a composite transmission medium comprising a plurality of separate lanes, the method comprising: receiving the plurality of transfer units from the plurality of separate lanes; performing delay equalization across all of the plurality of separate lanes; recombining the plurality of transfer units received through the composite medium into the packet.

In some embodiments the method of receiving a packet further comprises detecting that one or more of the plurality of separate lanes has failed, a failure indicated by a lack of reception of any type of recognisable sequence of data symbols or incorrect reception of such data as detected by an error control code; signalling to a transmitter at another end of the composite medium on a working lane which lane(s) have experienced failure (or degradation).

In some embodiments the method further comprises monitoring failed lanes for receipt of an idle pattern, and signalling the transmitter on a working lane that a failed lane(s) has recovered after detecting the idle pattern on the failed lane(s).

According to another aspect of the present invention, there is provided a transmitter for transmitting in parallel data symbols common to a single packet having a packet size into a composite medium, the composite medium comprised of a plurality of separate lanes, the transmitter comprising: a segmenter for segmenting the packet into a plurality of variable size transfer units; and a physical layer interface adapted to transmit the plurality of variable sized transfer units from the segmenter into the composite medium.

In some embodiments the transmitter also comprises a plurality of rate adaptation circuits connected between the segmenter and the physical layer interface, each of which can be controlled to set the a corresponding rate of transmission for each of the plurality of separate lanes.

In some embodiments the segmenter of the transmitter is adapted to segment the packet into a plurality of variable sized transfer units subject to a constraint that each transfer unit has a respective size between a minimum transfer unit size and a maximum transfer unit size.

In some embodiments segmenter segments the packet into a plurality of variable sized transfer units subject to a further constraint that a fewest possible number of transfer units are used.

In some embodiments the segmenter, in segmenting the packet into a plurality of variable sized transfer units subject to the constraint that each transfer unit has a respective size between the minimum transfer unit size and the maximum transfer unit size and subject to the constraint that the fewest possible number of transfer units are used, is adapted to: determine a nominal transfer unit size; determine a nominal number of transfer units according to: nominal number of transfer units equals integer part of (packet size/nominal transfer unit size); if the packet size can be accommodated by the nominal number of transfer units each with a respective size between the minimum transfer unit size and the maximum transfer unit size, segmenting the packet into the nominal number of transfer units; otherwise, segmenting the packet into the nominal number of transfer units plus at least one additional transfer unit, each transfer unit having a respective size between the minimum transfer unit size and the maximum transfer unit size.

In some embodiments the transmitter is adapted to determine the nominal transfer unit size as a function of link conditions of the composite medium.

In some embodiments the transmitter is adapted to select the nominal transfer unit size to be either the minimum transfer unit size or the maximum transfer unit size.

In some embodiments the transmitter is further adapted to: receive an indication that at least one of said plurality of lanes which lane(s) has experienced failure or degradation; wherein the transmitter transmits the plurality of variable sized transfer units to the receiver only on working lanes of the plurality of separate lanes.

In some embodiments the transmitter is further adapted to: transmit an idle pattern on the at least one of said plurality of lanes which lane(s) has experienced failure or degradation to enable fault recovery detection at a receiver.

In some embodiments the transmitter adapted to transmit the plurality of variable sized transfer units from the transmitter to a receiver on the plurality of separate lanes does so such that each of the plurality of separate lanes each carry respective signals that are of varying rates in relation to one another, and the transmitter further adapted to adjust the respective varying rates to compensate for delay induced by the size of the packet.

According to another embodiment, there is provided a system comprising: the transmitter described above; said composite medium; and a receiver; wherein the transmitter is connected to the receiver via the composite medium.

In some embodiments of the system the plurality of separate lanes comprising the composite medium each correspond to a respective plurality of well-delineated frequency bands within a wideband of frequencies supported on a single optical fiber.

In some embodiments of the system the plurality of separate lanes compring the composite medium are supported by a plurality of well-delineated frequency bands distributed through-out multiple optical fibers.

In some embodiments of the system the plurality of separate lanes comprising the composite medium each carry respective signals that are substantially at the same rate in relation to one another.

In some embodiments of the system wherein the plurality of separate lanes comprising the composite medium each carry respective signals that are substantially at different rates in relation to one another.

According to another aspect of the present invention, there is provided a receiver for receiving in parallel a plurality of signals from a composite medium comprising a respective plurality of separate lanes, the receiver comprising: a physical layer interface adapted to receive in parallel the plurality of signals; an equaliser adapted to perform equalization across the respective plurality of lanes on the plurality of signals received; and a recombiner adapted to reconstruct a packet from a plurality of variable size transfer units carried on the signals from the plurality of separate lanes.

In some embodiments the receiver is further adapted to detect that one or more of the plurality of separate lanes has failed, a failure indicated by a lack of reception of any type of recognisable sequence of data symbols or incorrect reception of such data as detected by the use of an error control code.

In some embodiments the receiver is further adapted to signal to a transmitter located at another end of the plurality of separate lanes on a working lane which lane(s) have experienced failure (or degradation).

In some embodiments the receiver is further adapted to monitor failed lanes for receipt of an idle pattern, and signalling the transmitter on a working lane that a failed lane has recovered after detecting the idle pattern on the failed lane.

In some embodiments the receiver signals the transmitter on a working lane that a failed lane has recovered when the receiver detects an idle pattern on the failed lane.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

In order to transport data common to a single packet in parallel across a composite medium so that the efficiency of a link is improved while the complexity and cost of apparatus employed is reduced, a method and apparatus for segmenting packets into variable sized transfer units (TU's) is provided. In some embodiments the method and apparatus according to the invention may be employed advantageously in combination with the Generic Framing Procedure (GFP) as defined in ITU-T G.7041/Y.1303 that was ratified December 2001.

Figure 1A:
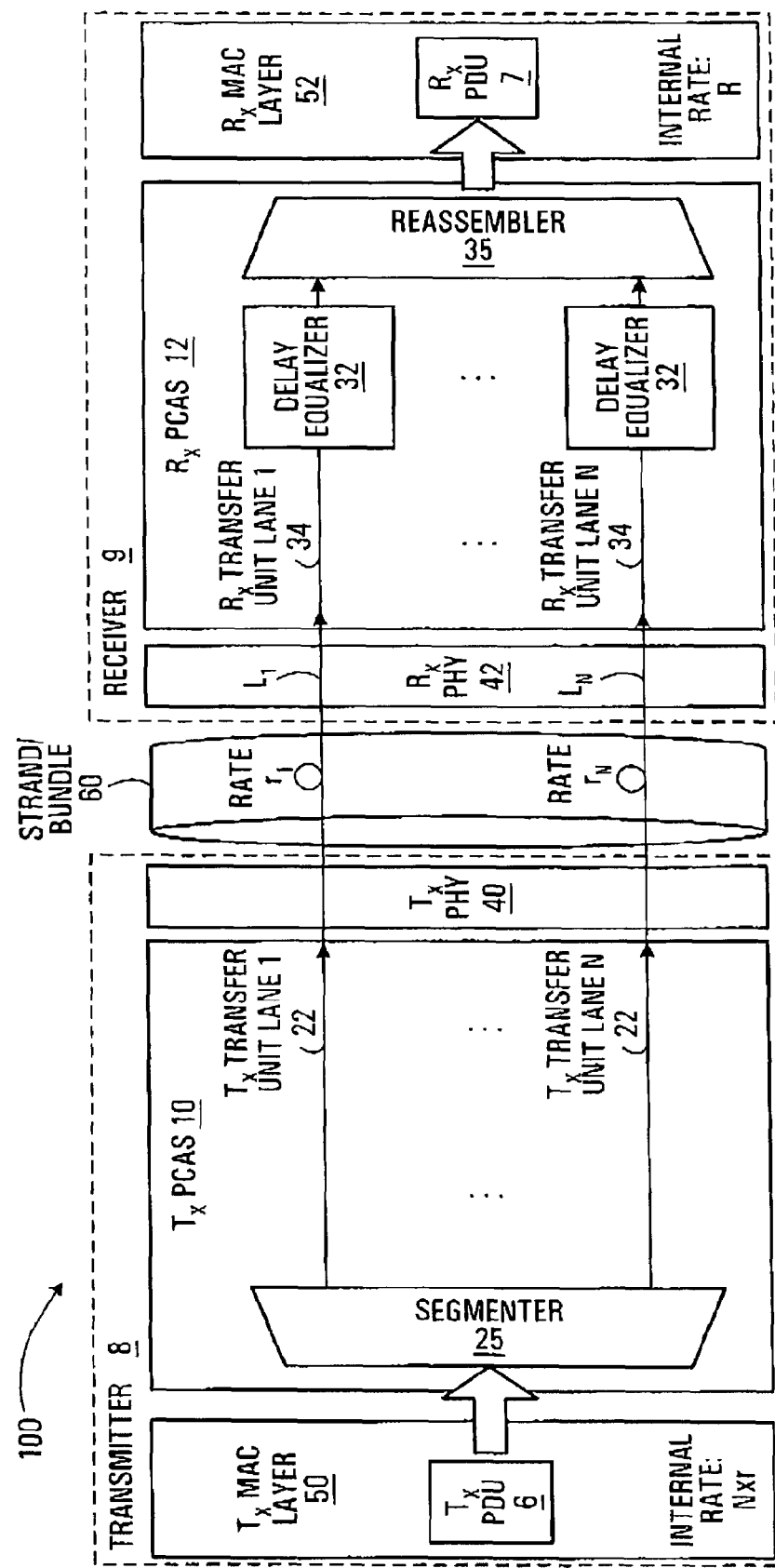
FIG. 1A is a block diagram of an optical communication system according to one embodiment of the invention.

Referring to FIG. 1A, illustrated is a block diagram of an optical communication system 100 according to one embodiment of the invention. A transmitter 8 is connected to a receiver 9 by a plurality of lanes $L_1$ to $L_N$ contained within a single strand or bundle of strands 60. For simplicity the single strand or bundle of strands 60 will be referred to as a composite medium 60.

The lanes $L_1$ to $L_N$ supported by the composite medium 60 are used in parallel to establish a link, having a high data rate R, between the transmitter 8 and the receiver 9. Accordingly, each of the lanes $L_1$ to $L_N$ has a corresponding rate of transmission (i.e. rate) $r_1$ to $r_N$, each of which is substantially lower than the high data rate (R). In some embodiments each of the rates $r_1$ to $r_N$ is substantially equal to a rate r, which is approximately equal to R/N, N being the total number of lanes (channels) supported by the composite medium.

However, the rates $r_1$ to $r_N$ do not necessarily need to be substantially equal to one another. For example, it is possible that, while the summation of the rates $r_1$ to $r_N$ is substantially equal to R (and preferably somewhat greater), each one of the rates $r_1$ to $r_N$ is unique and less than R.

Referring still to FIG. 1A, the transmitter 8 includes a combination of hardware, software and firmware grouped into functional blocks and layers. A first layer within the transmitter 8 is widely known as a $T_x$ Media Access Control (MAC) Layer 50 and is a combination of hardware, software and firmware whose broad function is to control how the transmitter 8 gains access to data and the process to transmit data. A commonly known second layer within the transmitter is a $T_x$ physical (PHY) layer 40 having the broad function of emitting the actual physical signal used to represent the encoded data symbols (for example, sequences of microwave electromagnetic or laser light impulses) through the composite medium 60. In other words the $T_x$ PHY layer 40 is made up of elements such as serializers, lasers, electro-optic modulators and the like used co generate sequences of physical emissions representing information bearing symbols.

Traditionally, the functional blocks in the $T_x$ MAC layer 50 would directly couple to and drive the elements of the $T_x$ PHY layer 40. However, provided by the present embodiment of the invention is a new functional layer embodied by a $T_x$ Physical Capacity Aggregation scheme (PCAS) unit 10 connected between the $T_x$ MAC layer 50 and the $T_x$ PHY layer 40. The $T_x$ PCAS 10 comprises a segmenter 25 that branches out to a plurality of N $T_x$ Transfer Unit Lanes (TULs) 22. Each of the N outputs of the segmenter 25 serves as a signal source for a corresponding lane $L_1$ to $L_N$ within the composite medium 60. The $T_x$ PCAS unit 10 (and thus the N outputs of the segmenter 25) is connected to the composite medium 60 via the $T_x$ PRY layer 40.

The receiver 9 similarly includes a combination of hardware, software and firmware grouped into functional blocks and layers corresponding to those found within the transmitter 8. The receiver 9 also has a PHY layer and MAC layer shown in FIG. 1A as $R_x$ PHY layer 42 and $R_x$ MAC layer 52. The $R_x$ PHY layer 42 and $R_x$ MAC layer 52 have complementary functions and apparatus to the $T_x$ PHY layer 40 and $T_x$ MAC layer 50 in the transmitter 8. The $R_x$ PHY layer 42 and $R_x$ MAC layer 52 are traditionally connected directly to one another. According to the present embodiment of the invention a $R_x$ PCAS unit 12 is connected between the $R_x$ PHY layer 42 and $R_x$ MAC layer 52. The $R_x$ PCAS unit 12 provides the complementary functions to that of the $T_x$ PCAS unit 10 in addition to equalization of the received data to compensate for anomalies amongst the lanes that make up the composite medium 60.

Specifically, the $R_x$ PCAS unit 12 comprises a plurality of $R_x$ TULs 34 (i.e. internal receive-side lanes) coupled to respective delay equalizers 32 for each lane $L_1$ to $L_N$ respectively. The outputs of the delay equalizers 32 for the lanes $L_1$ to $L_N$ are aggregated within a reassembler 35, which in turn is coupled to deliver an output to the $R_x$ MAC layer 52. Each of the plurality of $R_x$ TULs 34 is coupled to a respective lane $L_1$ to $L_N$ within the composite medium 60 via the $R_x$ PHY layer 42.

In operation, the optical communication system 100 shown in FIG. 1A operates to transport data common to a single packet (or more generally protocol data units (PDU's)) in parallel, through the composite medium 60. Beginning in the transmitter 8 the $T_x$ MAC layer 50 delivers to the $T_x$ PCAS unit 10 a $T_x$ PDU 6. Generally, a typical PDU contains a large number of bytes $N_{PDU}$ that are to be sent to the receiver 9 at a rate representative of R, the desired rate, The rate R at which the PDU is to be transmitted can be known by the $T_x$ PCAS unit 10 a priori or information about the rate R can be sent from the $T_x$ MAC layer 50 to the $T_x$ PCAS unit 10.

Once a PDU has been accepted by the $T_x$ PCAS unit 10 the segmenter 25 proceeds to divide the $T_x$ PDU 6 into smaller variable sized transfer units (TU's). The TU's are also formatted and assigned sequence numbers (and/or a time stamp, along with other header information) to facilitate re-assembly of data originating from $T_x$ PDU 6. The method of segmentation of a PDU into variable sized transfer units is described in detail below with reference to FIG. 2. The TU's are then distributed among the $T_x$ TULs 22, from which they are passed to the $T_x$ PHY layer 40. The elements for the corresponding lanes $L_1$ to $L_N$ within the $T_x$ PHY layer 40 are then operated at the rates $r_1$ to $r_N$ respectively to transmit the TU's through the composite medium 60. It would be appreciated by those skilled in the art that the $T_x$ PCAS unit 10 is supported by a combination of hardware, software and firmware and described above is the combined functionality of those elements.

At the receiver 9 TU's arriving on the respective lanes $L_1$ to $L_N$ are first received by the elements of the $R_x$ PHY layer 42 where they are converted from optical signals to electrical signals, and then directly passed to corresponding $R_x$ TULs 34. The $R_x$ TULs 34 receive TU's on each of the lanes $L_1$ to $L_N$ at respective rates $r_1$ to $r_N$. The delay equalisers 32 compensate for differences in the respective signals and pass the TU's from each lane $L_1$ to $L_N$ to the reassembler 35. There are a number of factors, such as the physical inconsistencies between lanes that may add to propagation delays and frequency drift experienced by signals traversing the composite medium 60. Consequently, the respective received signals differ because of uncontrollable parasitic delays and frequency drift such that the rates $r_1$ to $r_N$ cannot be guaranteed to be equivalent to one another once the respective signals reach the receiver 9.

The delay equalizers 32 and the reassembler 35 use the sequence numbers assigned to the TU's in the transmitter 8 to reconstruct the received TU's into $R_x$ PDU 7. The $R_x$ PDU 7 should be equivalent to $T_x$ PDU 6 barring any catastrophic errors, for example, errors that could not be corrected by using error control coding. Various forms of error control could be employed to complement the present invention, as is the case for most other systems The receiver 9 may also signal to the transmitter 8 that a PDU has or has not been successfully reconstructed. In the event that a PDU has not been successfully reconstructed that receiver 9 may request that one or more of the TU's that make up the PDU be resent or that the entire set of TU's be resent.

It should again be stressed that the rates $r_1$ to $r_N$ are each significantly lower than the rate R; but employed in parallel the rates $r_1$ to $r_N$ can be used to transport data through the composite medium 60 at a rate substantially equivalent to R, the desired race. The efficiency with which the bandwidth within each of the lanes is used is substantially increased because the method used to segment the PDU's uses variable-size cells. Thus, the capacity of the link is almost fully realized. This will be discussed in detail below in relation to FIG. 4.

Figure 1B:
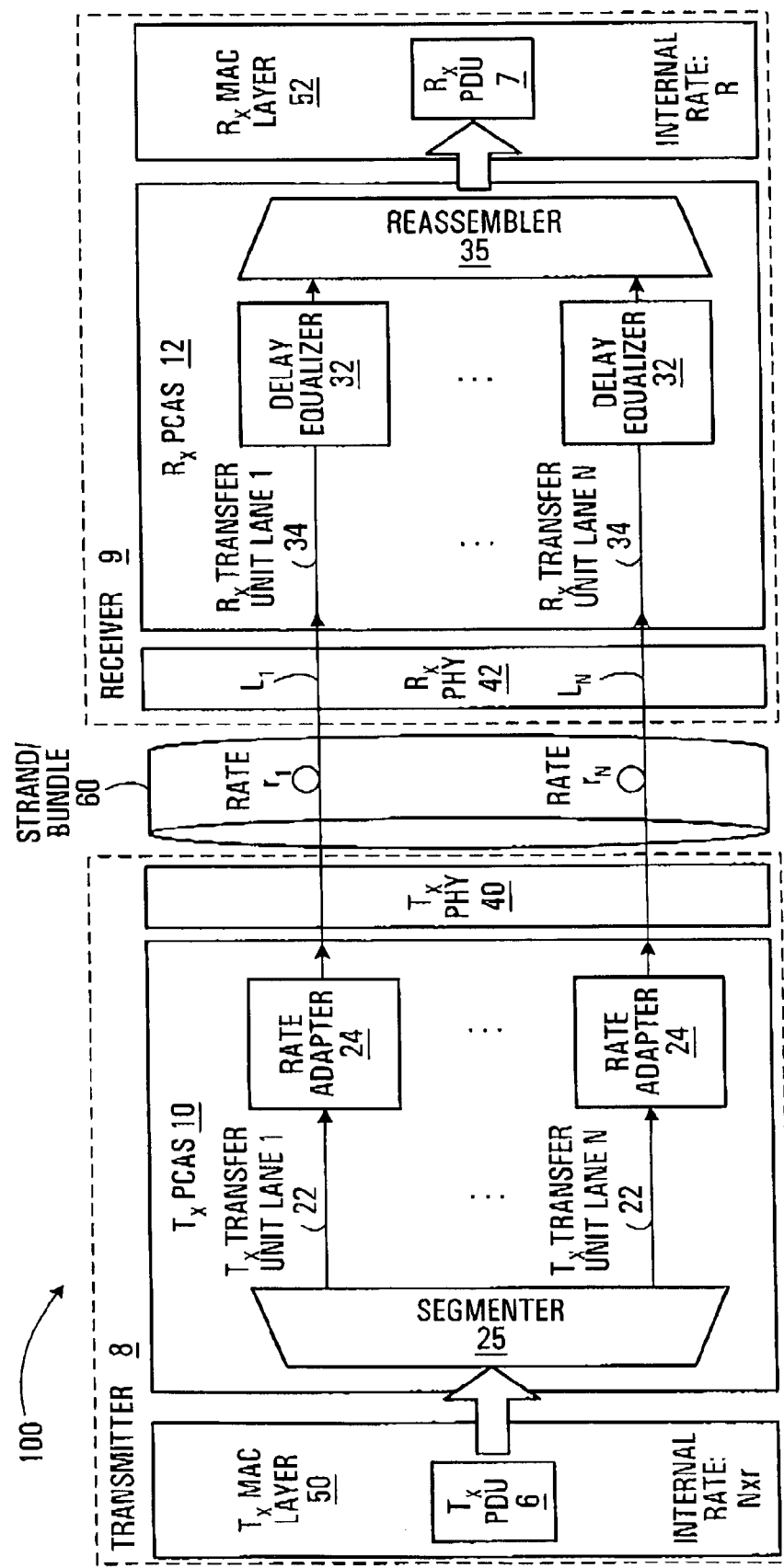
FIG. 1B is a block diagram of an adaptation of the optical communication system illustrated in FIG. 1A.

Shown in FIG. 1B is an adaptation of the invention presented in FIG. 1A. FIG. 1B is similar to FIG. 1A, thus like components are labelled as they are in FIG. 1A. In the adaptation of the invention shown in FIG. 1B the $T_x$ PCAS unit 10 has been modified to include a plurality of rate adapter circuit blocks 24. Each of the rate adapter circuit blocks 24 is coupled between an output of the segmenter 25 and the $T_x$ PHY layer 10 on each of the plurality of $T_x$ TULs 22 respectively. Accordingly, TU's are sent to respective rate adapter circuit blocks 24 which override the function of the $T_x$ PHY layer 40 to the extent that the transmission rates $r_1$ to $r_N$ are now controlled by the respective race adapter circuit blocks 24.

The rate adapter circuit blocks 24 can dynamically adjust the rates $r_1$ to $r_N$ to new rates $r_1'$ to $r_N'$ in order to maintain R as the real rate at which data in carried through the composite channel 60. The newly adjusted rates $r_1'$ to $r_N'$ remain less than R, the desired real rate. Preferably the number of lanes $L_1$ to $L_N$ comprising the composite medium is chosen so that the marginal increases to rates $r_1$ to $r_N$ required to sustain the real rate at a value close to R falls within a known and controlled range.

Figure 2:
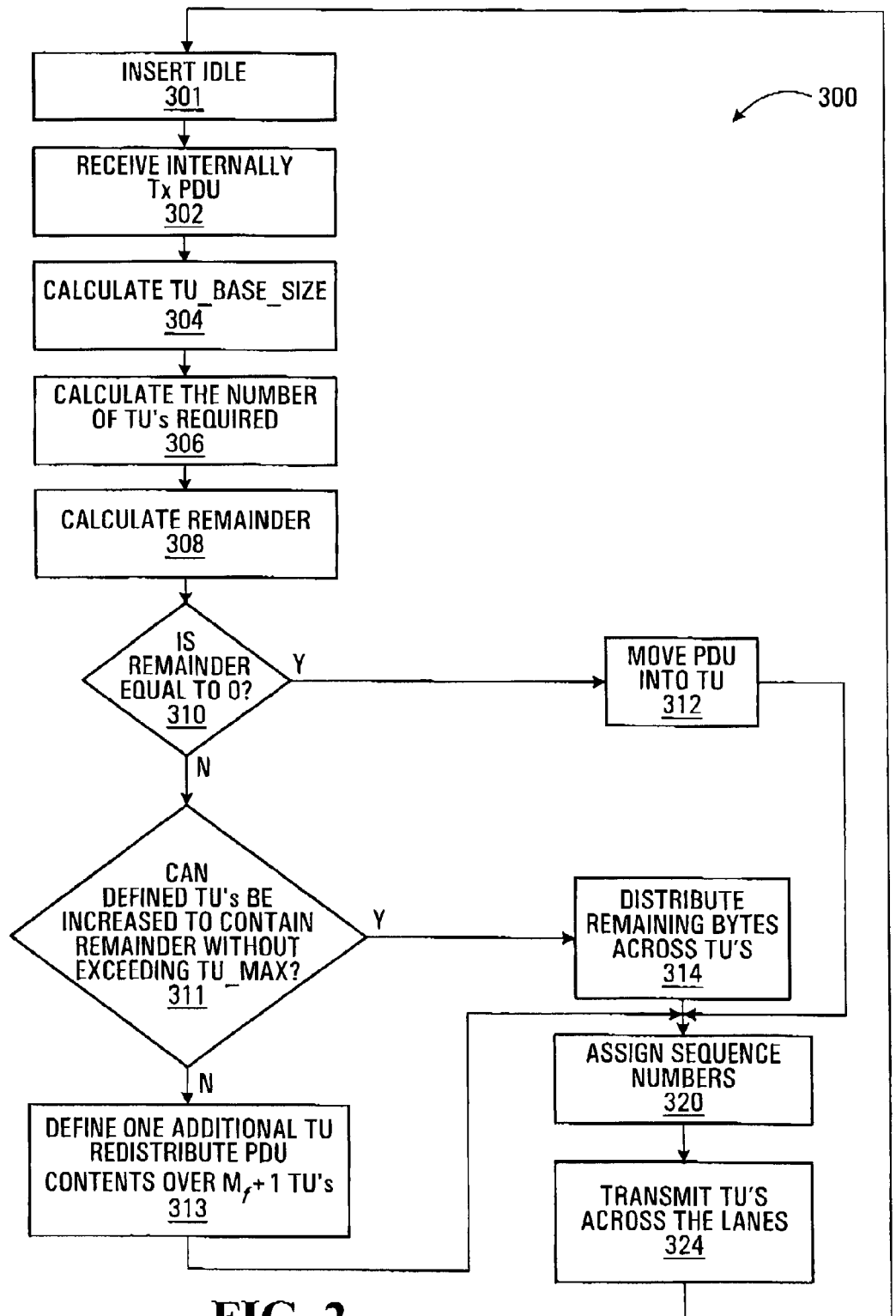
FIG. 2 is a flowchart illustrating a method of segmenting a protocol data unit (or packet) into a number of smaller transfer units corresponding to those used in the embodiment of the invention used in FIG. 1.

Shown in FIG. 2 is a flow chart 300 detailing the method steps the $T_x$ PCAS unit 10 of FIG. 1A follows to segment a PDU into smaller TU's. For the sake of the present discussion the smallest data unit considered is a byte (i.e. an 8 bit binary sequence), but it should be understood that the invention is not constrained to the use of bytes, as other base units could be used.

Definitions for the terms "TU_min", "TU_max" and "TU_base_size" are given below and hereinafter used to aid in the description of the method steps illustrated by FIG. 2. The term TU_base_size is an initial size of all transfer units and its value ranges from TU_min to TU_max, where TU_min and TU_max are system parameters defining the minimum and maximum sizes of any given transfer unit respectively. The parameters TU_min and TU_max can be set by automated processes that generate optimum values for each. The actual value of TU_base_size is determined as a function of link conditions. In some embodiments TU_base_size is selected to be either TU_min or TU_max only for a given PDU based on the current link conditions. Also, in some embodiments TU_max is defined to have a value double that of TU_min (i.e. TU_max=2TU_min). In some embodiments, TU_min is calculated to minimize jitter at the expense of latency.

By way of overview, a number $M_f$ of transfer units having an initial size of TU_base_size is initially defined where:

$$M_f = \text{Integer part of } (N_{PDU}/TU\_base\_size) \quad (1)$$

However, unless TU_base_size divides $N_{PDU}$ evenly, the number $M_f$ of transfer units each having a size of TU_base_size will not provide a combined capacity required to accommodate the entire contents of a given PDU. Thus, as will be detailed below, one or more of the transfer units is adjusted in capacity and possibly a single additional transfer unit, being no smaller than TU_min, may be added to accommodate the contents of the given PDU depending upon the current link conditions.

Referring now to FIG. 2 and with further reference to FIG. 1A, by default the $T_x$ PCAS unit 10 will loop through an insert idle step 301 while the $T_x$ PCAS unit 10 awaits a PDU to process from the $T_x$ MAC layer 50. At step 302 the $T_x$ PCAS unit 10 receives a PDU from the $T_x$ MAC layer 50. It would be understood in the art that there would typically be a handshaking and acknowledgement procedure between the $T_x$ PCAS unit 10 and the $T_x$ MAC layer 50 for this step to take place reliably.

In either case, the $T_x$ PCAS unit 10 would then proceed to determine TU_base_size at step 304. TU_base_size (initial size of a transfer unit), in some embodiments is set to either TU_min (the minimum possible size of a transfer unit) or TU_max (the maximum possible size of a transfer unit). The transfer unit base size (TU_base_size) may be adjusted up to TU_max to take advantage of favourable link conditions and high available data rates at any time.

For example, TU_min could be set at 64 (bytes) and TU_max at 128 (bytes). The TU_base_size in favourable link conditions might be set as high as 128.

The next step 306 is to calculate the number $M_f$ of TU's. The number $M_f$ of TU's required depends on $N_{PDU}$, TU_base_size and by TU_max. The number $M_f$ of TU's required is determined in step 306 to be the integer portion of the quotient of the PDU size $N_{PDU}$ (in bytes) divided by the TU_base_size parameter as indicated in equation (1) presented above. The integer of the quotient is the integer portion of a real number obtained by truncating the number to the nearest unit value.

Upon completion of step 306 the $T_x$ PCAS unit 10 has established the number $M_f$ of TU's into which the PDU will be placed, and all of the TU'S share a common TU_base_size. However, the PDU size $N_{PDU}$ (in bytes) is not guaranteed to be evenly divisible by TU_base_size and as a result there may be a remaining number of bytes that must be distributed among the existing TU's or allocated to a single new TU.

The remaining number of bytes can be calculated either by subtracting the product of TU_base_size and the number $M_f$ of TU's from $N_{PDU}$ or by performing a calculation of the MOD (Modulus) of $N_{PDU}$ in relation to TU_base_size. Both procedures will yield identical results. Thus, in step 308 the $T_x$ PCAS unit 10 calculates the remaining number of bytes, otherwise known as the remainder, and in step 310 a comparison is made to determine whether or not the remainder is equal to zero.

At step 310 if the remainder is equal to zero (yes path, step 310), the $T_x$ PCAS unit 10 proceeds to step 312 in which the contents of the PDU are transferred directly into the TU's. The $T_x$ PCAS unit 10 acts to keep track of how a PDU is segmented as the PDU's contents are transferred into the TU's.

On the other hand, if the remainder is not equal to zero (no path, step 310), the $T_x$ PCAS unit 10 proceeds to step 311. At step 311 the $T_x$ PCAS unit 10 determines whether or not any or all of the number $M_f$ of TU's already defined can be adjusted in terms of their capacity to accommodate the remaining number of bytes (i.e. the remainder) without exceeding TU_max.

If the capacity provided by the number $M_f$ of TU's can be adjusted to accommodate remainder (yes path 311), the $T_x$ PCAS unit 10 proceeds to step 314. At step 314 the capacity of some of the TU's may be increased so that the remaining bytes can be distributed among the plurality TU's or appended to one TU. In other words, before the PDU is segmented and moved into the TU's, extra bytes are allocated to a number of the TU's so that the entire PDU can be segmented and moved into the number $M_f$ of TU's. In some embodiments extra bytes are evenly allocated to a number of TU's so that the remaining bytes are as evenly distributed amongst the plurality of TU's as possible. It should be clear that the remaining number of bytes is less than the TU_base_size.

Alternatively, if the capacity provided by the number $M_f$ of TU's can not be adjusted to accommodate the remainder (no path 311), the $T_x$ PCAS unit 10 proceeds to step 313. At step 313 an additional TU is defined to contain the remaining number of bytes (i.e. the remainder). More generally, the entire PDU is redistributed in some manner over $M_f+1$ TU's, subject to the constraints that no TU has a size less than TU_min, and no TU has a size greater than TU_max. Preferably, the $M_f+1$ TU's are made as close as possible in size. If the remainder is less than TU_min, then it would be necessary that the contents of at least one of the $M_f$ TU's defined with size TU_base_size will need to be redistributed to the $M_f+1^{st}$ TU so that no TU has a size less than TU_min.

In some embodiments the way the additional TU is defined at step 313 is dependent upon the size of the remainder and TU_base_size in relation to TU_min and TU_max. The following specific implementation examples assumes TU_max=2 TU_min.

If TU_base_size was chosen to be TU_min and the remainder is less than TU_min, then the remainder would have been distributed among the $M_f$ TU's as described in step 314 (i.e. the $T_x$ PCAS unit 10 would not have proceeded to this point).

However, if the remainder is greater than TU_min and since for these specific circumstances, there will be room in the $M_f$ TU's for the remainder, another TU is defined that is the size of the remainder, which is larger than TU_min and smaller than TU_max (since TU_max=2TU_min).

If the TU_base_size was chosen to be TU_max and the remainder is less than TU_min then the remainder cannot be redistributed over the $M_f$ TU's, and a new TU having a size equal to the remainder will be smaller than TU_min which is not allowed. Therefore, some redistribution over $M_f+1$ TU's is necessary. For the specific implementation where TU_max=2 TU_min, one of the original $M_f$ TU's (having a initial size of TU_max) can be split into two TU's each having an initial size of TU_min (again relying on the fact that TU_max=2TU_min). The remainder can then be split amongst the two TU's just defined having an initial size of TU_min. On the other hand, if the remainder is greater than TU_min, then a new TU can be defined having an initial size of TU_min; but then the new TU is adjusted in size to provide enough capacity for the entire remainder.

As a numerical example of the above, say there is a PDU having 20 bytes and TU_min is 6 bytes and TU_base_size is chosen as the TU_min. From the above discussion following through from steps 302 to the instant before step 320 the $T_x$ PCAS unit 10 would define three TU's (i.e. $M_f=3$), each initially with a capacity of 6 bytes. With an initial capacity of 6 bytes only 18 bytes of the 20-byte PDU would fit into the three TU's. Prior art solutions would have the system add a fourth 6-byte TU, but that TU would obviously contain 4 bytes of meaningless information or padding, thus reducing the efficiency of the link. According to one embodiment of the invention extra capacity for the 2 remaining bytes is allocated to two of the three TU's. Thus, there would be two TU's with a capacity of 7 bytes and the third with a capacity of 6 bytes. All three TU's would now have a total combined capacity that provides space for all of the contents of the 20-byte PDU. Preferably, in this example, the 20-byte PDU is segmented in sequence so that its bytes 0-6, 7-13 and 14-19 can be moved into the two 7 bytes TU's and the one 6 byte TU respectively. Alternatively, the two remaining bytes could have been allocated to one of the three transfer units, as long as the addition of the two remaining bytes did not increase the transfer unit they were added to beyond TU_max.

If the TU_base_size was selected to be TU_max and there was a remainder, the operation of the TX PCAS unit 10 would follow steps 311 and 313 from 310. As an alternative but related example, suppose that TU_min is 6, TU_max is 12, i.e. TU_max=2 TU_min, and suppose the very specific TU splitting method described above for this scenario is being implemented. Assume that the PDU size is 27 bytes and the TU_base_size has been chosen to be TU_max due to favourable link conditions. In this case the initial number $M_f$ of TU's calculated would be two. However, two 12 byte TU's would only provide enough capacity to transport 24 bytes of the 27. In this case, one of the two 12 bytes TU's would be split into two 6 byte TU's (at step 313) and there would then be a total of 3 TU's (i.e. $M_f+1$): one 12 byte TU and two 6 byte TU's. The remaining 3 bytes would be divided between the two 6 byte TU'S to provide all of the desired capacity (27 bytes).

However, suppose that the PDU size is 23 and TU_base_size remains set at TU_max (12). In this case, the initial number of TU's required would be one; but that would only provide enough capacity for 12 of the 23 bytes. There would be a total of remaining 11 bytes (a number greater than or equal to TU_min and less than TU_max). These 11 bytes would require at least one more TU of 6 bytes to which 5 bytes of capacity to the TU could be added without violating the maximum size of a transfer unit specified by TU_max.

Following steps 312 or 313 or 314, in step 320 sequence numbers are assigned to each of the TU's. The details of the sequence numbers are elaborated upon further on in relation to FIG. 3. And finally, at step 324 each of the TU's is transmitted across one of the lanes $L_1$ to $L_N$ that the particular TU has been assigned to. In preferred embodiments of the invention, the TU's are assigned to the different lanes $L_1$ to $L_N$ in a round-robin fashion, in order to evenly distribute the TU's throughout the composite medium 60. It is conceivable that other schemes for distributing the TU's may be used for various other reasons, however the round-robin type distribution is simple and uses the available bandwidth efficiently.

Figure 3:
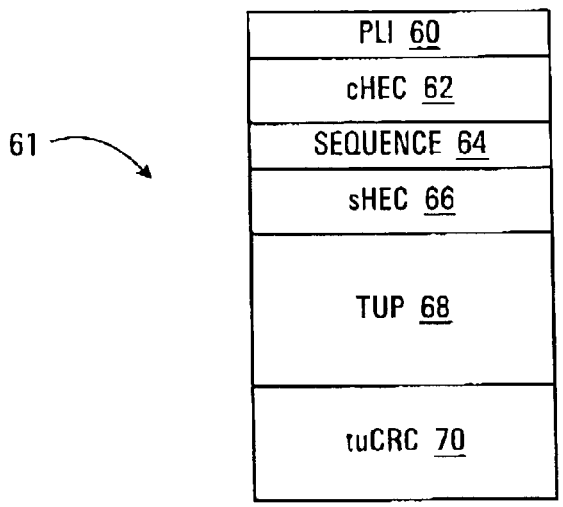
FIG. 3 is a diagram of the structure of a transfer unit according to an embodiment of the invention.

Referring to FIG. 3, shown is an example of a TU frame structure 61 according to a preferred embodiment of the invention. The TU frame structure 61 complies with the Generic Framing Procedure (GFP) as defined in ITU-T G.7041/Y.1303 that was ratified December 2001 and the entire contents of which are herein incorporated by reference.

A first field in the TU frame structure 61 is a Payload Length Indicator (PLI) field 60. According to the GFP the PLI field 60 is two bytes long and indicates the number of bytes in the payload area of a frame. In the present embodiment the payload (to be discussed in more detail further on) will store a segment of a PDU.

A second field in the TU frame structure 61 is a two-byte Core Header Error Control (cHEC) field 62. Again according to the GFP the cHEC contains a CRC-16 error control code that protects the integrity of the contents of the PLI field 60 in combination with the cHEC field 62 by enabling both single-bit error correction and multi-bit error detection.

A third field, specific to the present embodiment of the invention, is a sequence number field 64, having four bytes. The sequence number field 64 is provided, in place of a Payload Information Field (PIF) that was originally specified in the GFP, according to the present embodiment of the invention. This does not adversely effect the TU frame structure 61 as it relates to the GFP specification, but it does allow for customization of the TU frame structure 61 to meet the desired requirements of the present invention.

In some embodiments the sequence number field 64 is comprised of three sub-fields. In one embodiment of the invention the maximum payload size for a PDU is 2048 bytes and TU_min is set at 64 bytes. The first of the three sub-fields is a four-bit packet number field used to distinguish TU's belonging to the same or different packets. The second sub-field is composed of two 5-bit binary numbers $N_f$ and $M_f$, where $N_f$ indicates TU $N_f$ out of $M_f$ total TU's belonging to a PDU. The third sub-field is a 4-bit sequence representing which lane $L_1$ to $L_N$ a TU is carried on.

In some embodiments four additional sub-fields are provided consisting of a time stamp sub-field, a type sub-field, a tuCRC presence sub-field, and header extension sub-field, which maybe each employed as required.

Similar to the second field, provided as a fourth field in the TU frame structure 61 is a Sequence Header Error Control (sHEC) field 66. The sHEC field 66 also contains (in two bytes) a CRC-16 error control code that protects the integrity of the contents of the sequence number field 64 in combination with the sHEC field 66 by enabling both single-bit error correction and multi-bit error detection across the two fields (64 and 66).

A fifth field in the TU frame structure is a TU Payload (TUP) field 68. It is within the TUP field 68 that a corresponding segment of a PDU is carried through a lane. The TUP field 68 size will be at least TU_min and at most TU_max. The TUP field 68 is expanded (to a maximum of TU_max) upon accordingly in order to ensure that there is enough capacity in all the TU's corresponding to a single PDU.

The final field in the TU frame structure 61 is a four-byte CRC field, known as the tuCRC field 70. The tuCRC field 70 contains a CRC-32 error control code that protects the integrity of the contents of the TUP field 68 in combination with that of the tuCRC field 70 by enabling both single-bit error correction and multi-bit error detection.

In preferred embodiments of the invention the CRC-16 error control codes used in the cHEC field 62, and the sHEC field 66, may be the same CRC-16 error control code as they are applied independently to different portions of the TU frame structure 61. The tuCRC is a CRC-32 error control code because a higher polynomial CRC is preferred due to the large number of data bits, i.e. pre-coded TUP bits. This latter field is optional because the PDU maybe covered by a frame check sequence which may be validated by the receive client which would make the tuCRC redundant. Moreover, the three codes may be applied in varying ways. Varying methods of applying CRC error control codes are known in the art and it would be understood by those in the art that a particular method can be used to obtain a particular result.

Figure 4:
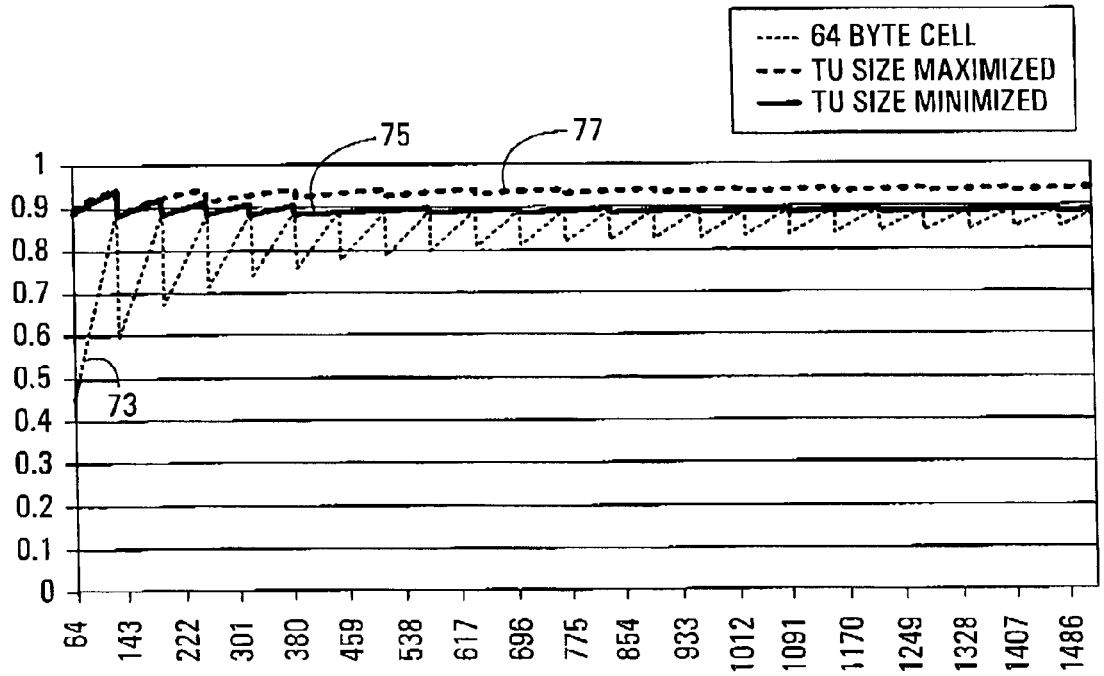
FIG. 4 is an efficiency plot comparing the example efficiencies of adaptations of the invention to prior solutions that employ fixed-size cells.

FIG. 4 shows calculation results comparing the efficiencies of adaptations of the invention to prior solutions that employ fixed-size cells. Specifically, referring to plot 73, depicted is the efficiency plot for a standard 64-byte fixed-size cell. The plot 73 clearly illustrates that the efficiency for a system using 64-byte fixed-size cells varies wildly from well below 50% to 90% at best. In practical circumstances it is difficult Co ensure that every packet (or PDU) is divisible by a specific cell size. Thus, the efficiency of the link in practice can not be guaranteed to be high most of the time. Consequently, the real rate of data throughput is degraded significantly.

Alternatively, referring to plots 77 and 75 respectively, for adaptations of the invention simulated where the number of TU's used to transfer an aribitary PDU is either maximized (smallest TU size used) or minimized (larger TU values used) the efficiency varies very little. On average the efficiencies are typically better than 87% most of the time for both adaptations and consistently well over 90% when TU_base_size is maximized. The variable TU sizing (between 64-128 bytes) removes the inefficiency. It would be understood that the efficiency could not actually be 100% since each TU must contain header information that is considered overhead that degrades the efficiency of the system. In fact, if TU_min is too small the efficiency would be seriously degraded since there would be a disproportionate amount of header information required for the resulting large number of TU's per PDU.

Figure 5:
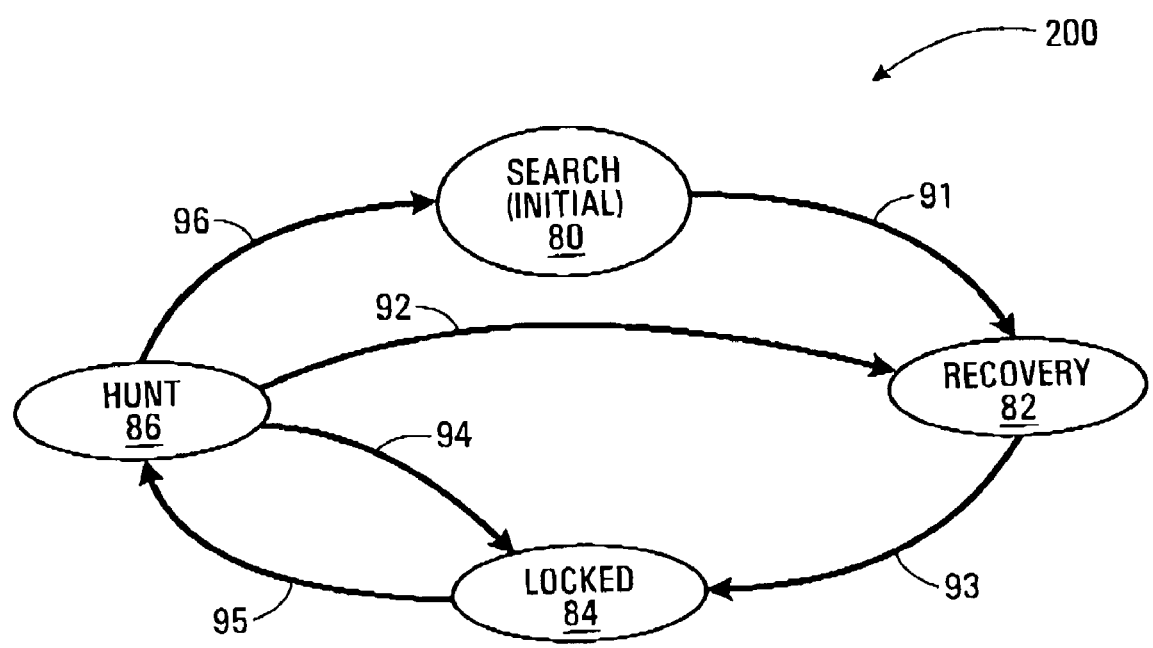
FIG. 5 is a state diagram depicting the synchronization process provided in some embodiments of the invention for dealing with lane failures within a composite channel connecting and transmitter and a receiver according to an embodiment of the invention.

During Operation, Administration and Management (OA&M) of an optical communication system like the one shown in FIG. 1 it would be desirable for the receiver 9 to signal the transmitter 8 in the event of a lane failure. Shown in FIG. 5 is a state diagram 200 illustrating the synchronization process between the transmitter 8 and the receiver 9 in which the receiver 9 handles the detection and signalling of a lane failure. A failure could be signal degrade (SD) introducing excess bit error, as detected by tuCRC or signal fail (SF) such as lost of optical signal.

In the event of a lane failure, if the individual lane transmission rates of the remaining operational lanes are not adjusted then the combined rate is reduced by the capacity lost from the failed lane. That is, the summation of the remaining rates will be less than the desired combined rate (i.e. capacity) R by an amount equal to the rave of the failed lane before it failed.

The transmitter 8 at the near end sends to the receiver 9 at the far end. Similarly, the far end transmitter sends data to the near end receiver. When the far end receiver detects a failure, such as SD or SF, the status should be relayed to the near end so the defective lane will not be used in the composite medium 60. Upon receiving a signal from the receiver 9 that a lane or a group of lanes are not available for reliable transmission the transmitter 8 will skip over the failed lane(s) for data transmission until such time that the receiver 9 signals that the lane(s) are again reliable for transmission. However, the transmitter 8 in some embodiments transmits an OA&M idle signal through the lane(s) that were designated unreliable to enable the receiver 9 to detect fault recovery. In the event that the lanes(s) recover from a fault the receiver 9 will then signal to the transmitter 8 and the transmitter will then reestablish data transmission through the recovered lane(s).

The receiver 9 will then operate to monitor the recovered lane(s) for valid TU's and automatically attempt to reassemble a PDU based on received TU's. All of the lanes would be preferably bi-directional, and so fault signals could be transmitted from the receiver 9 to the transmitter 8 on any working lane. Otherwise remote fault signalling will have to be used to indicate the failure of the complete channel rather than failure of a signal lane. The two options are degraded performance under a failure of a lane or a complete failure of the channel due to one lane failure.

Referring to FIG. 5 and imagining an arbitrary lane, it can be initially assumed that the receiver 9 is in an initial search state 80. While in the search state 80 the receiver 9 monitors the arbitrary lane for either an idle signal or valid TU. If either of the two aforementioned is detected on the arbitrary lane the receiver 9 proceeds to a second state, known as the recovery state 82 in which the receiver is looking specifically for a valid TU. A valid TU includes idle signal received without error. A TU detected for the previous state transition 91 into the recovery state 82 can be used again for a state transition 93 from the recovery state 82 into a locked state 84.

The receiver 9 remains in the locked state 84 in regard to the arbitrary lane as long as the receiver is receiving TU's through the arbitrary lane being considered. If the receiver 9 detects a signal fault or rather a lane fault due to a lack of reception of any type of signal on the arbitrary lane or TU received with errors, the receiver 9 changes state to the hunt state 86. The receiver 9 would also signal the transmitter through a return lane (in the case of bidirectional configuration this is in the opposite direction) that the lane being monitored is not reliable for data transmission. However, if the receiver 9 receives a valid TU while in the hunt state 86 it will change states back into the locked state 82, This type of situation may occur when there is bit error on the medium causing the error control module to discard a received TU.

Alternatively, from the hunt state 86, the receiver may either move through a state transition 92 to the recovery state 82, if it were to receive an OA&M idle signal, or move through state transition 96 to the initial search state 80 if no signal were present on the arbitrary lane being considered. The hunt state 86 provides a faster recovery of the lane in case of a error condition which transient. Persistence error conditions will cause the state machine to transit to the initial state 80.

What has been described is merely illustrative of the application of the principles of the invention. Other arrangements and methods can be implemented by those skilled in the art without departing from the spirit and scope of the present invention.

I claim:

1. A method of simultaneously transmitting, in parallel, data symbols common to a single packet across a plurality of separate physical lanes supported by a composite medium and collectively forming a link between a transmitter and a receiver, the packet having a packet size, the method comprising:
   segmenting the packet into a plurality of variable sized transfer units subject to the constraint that each transfer unit has a respective size between a minimum transfer unit size and a maximum transfer unit size and subject to the constraint that the fewest possible number of transfer units are used, the step of segmenting comprising:
   i) setting values TU_min and TU_max, the value TU_min being the minimum size of a transfer unit and the value TU_max being the maximum size of a transfer unit;
   ii) setting a nominal transfer unit size, TU_base_size, depending upon a condition of the composite medium;
   iii) calculating a minimum number of transfer units by dividing the packet size by the nominal transfer unit size;
   iv) calculating a remaining number of data symbols for the packet that do not fit into the minimum number of transfer units calculated in step iii);
   v) if the remaining number of data symbols is greater than zero distributing the remaining data symbols amongst the minimum number of transfer units calculated in step iii) if there is room to do so without increasing any transfer unit beyond TU_max;
   vi) if the remaining number of data symbols is greater than zero and there is not room to distribute the remaining data symbols amongst the minimum number of transfer units calculated in step iii), defining at least one additional transfer unit above the minimum number of transfer units calculated in step iii) and distributing the entire packet over the minimum number of transfer units and the additional transfer units such that each transfer unit is approximately the same size, at least as large as TU_min, and no larger than TU_max;
   vii) adding a unique sequence number to each of the transfer units into which the packet has been segmented; and
   transmitting the plurality of variable sized transfer units from the transmitter to the receiver such that at least some of the data symbols common to the single packet are transmitted simultaneously from the transmitter to the receiver in parallel over at least some of the plurality of separate lanes of the composite medium interconnecting the transmitter and receiver and forming the link between the transmitter and receiver.

2. The method according to claim 1, wherein the nominal transfer unit size is selected to be either the minimum transfer unit size or the maximum transfer unit size.

3. The method of claim 1, wherein transmitting the plurality of variable sized transfer units from the transmitter to the receiver on the plurality of separate lanes is done by distributing the transfer units in a round-robin fashion to the plurality of separate lanes.

4. The method of claim 1 further comprising:
   receiving an indication that at least one of said plurality of lanes has experienced failure or degradation;
   wherein transmitting the plurality of variable sized transfer units from the transmitter to the receiver on the plurality of separate lanes is done only using working lanes of the plurality of separate lanes.

5. The method according to claim 4 further comprising:
   transmitting an idle pattern on the at least one of said plurality of lanes that has experienced failure or degradation to enable fault recovery detection at a receiver.

6. The method according to claim 1, wherein transmitting the plurality of variable sized transfer units from the transmitter to the receiver on the plurality of separate lanes is done such that each of the plurality of separate lanes each carry respective signals that are of varying rates in relation to one another, the method further comprising adjusting the respective varying rates to compensate for delay induced by the size of the packet.

7. A method according to claim 1, further comprising:
defining each transfer unit with a frame structure comprising:
i) a Payload Length indicator field (PLI);
ii) a Core Header Error Control (cHEC) field;
iii) the sequence number field;
iv) a sequence number Header Error Control (sHEC) field;
v) a transfer unit payload (TUP) field into which a segment (i.e. grouping of data symbols) of the single packet is copied; and
vi) a transfer unit Error Control (tuCRC) field.

8. The method according to claim 7, wherein cHEC field contains a CRC-16 error control code, and the CRC-16 error control code is applied to the PLI field.

9. The method according to claim 7, wherein sHEC field contains a CRC-16 error control code, and the CRC-16 error control code is applied to the sequence number field.

10. The method according to claim 7, wherein tuCRC field contains a CRC-32 error control code, and the CRC-32 error control code is applied to the TUP field.

11. The method according to claim 7, wherein each sequence number field is comprised of a packet number, a transfer unit indicia, and a lane number.

12. The method according to claim 11, wherein each sequence number field is further comprised of a time stamp field, the time stamp field containing a value indicating the time a particular transfer unit was transmitted.

13. The method according to claim 12, wherein each sequence number field is further comprised of a header extension field.

14. The method according to claim 11, wherein the packet number is a four-byte number unique to the single packet, such that each transfer unit associated with the single packet contains the same packet number.

15. The method according to claim 11, wherein the transfer unit indicia comprises two five-bit numbers $N_f$ and $M_f$, wherein $N_f$ represents transfer unit number $N_f$ of $M_f$, wherein $M_f$ is a total number of transfer units derived from the single packet.

16. A transmitter for transmitting in parallel data symbols common to a single packet having a packet size into a composite medium, the composite medium comprising a plurality of separate lanes and forming a link between the transmitter and a receiver, the transmitter comprising:
a segmenter for segmenting the packet into a plurality of variable sized transfer units, the segmenter being configured to segment the packet subject to the constraint that each variable sized transfer unit has a respective size between a minimum transfer unit size and a maximum transfer unit size and subject to the constraint that the fewest possible number of transfer units are used, the segmenter further being configured to segment the packet by:
i) setting values TU_min and TU_max, the value TU_min being the minimum size of a transfer unit and the value TU_max being the maximum size of a transfer unit;
ii) setting a nominal transfer unit size, TU_base_size, depending upon a condition of the composite medium;
iii) calculating a minimum number of transfer units by dividing the packet size by the nominal transfer unit size;
iv) calculating a remaining number of data symbols for the packet that do not fit into the minimum number of transfer units calculated in step iii);
v) if the remaining number of data symbols is greater than zero distributing the remaining data symbols amongst the minimum number of transfer units calculated in step iii) if there is room to do so without increasing any transfer unit beyond TU_max;
vi) if the remaining number of data symbols is greater than zero and there is not room to distribute the remaining data symbols amongst the minimum number of transfer units calculated in step iii), defining at least one additional transfer unit above the minimum number of transfer units calculated in step iii) and distributing the entire packet over the minimum number of transfer units and the additional transfer units such that each transfer unit is approximately the same size, at least as large as TU_min, and no larger than TU_max;
vii) adding a unique sequence number to each of the transfer units into which the packet has been segmented; and
a physical layer interface adapted to transmit the plurality of variable sized transfer units from the segmenter onto the plurality of separate lanes forming the composite medium, to enable the packet to be transmitted on the plurality of separate lanes as the plurality of variable sized transfer units such that at least some of the data symbols common to the single packet are transmitted simultaneously from the transmitter to the receiver in parallel over at least some of the plurality of separate lanes of the composite medium interconnecting the transmitter and receiver and forming the link between the transmitter and receiver.

17. The transmitter of claim 16, further comprising a plurality of rate adaptation circuits connected between the segmenter and the physical layer interface, each of which can be controlled to set a corresponding rate of transmission for each of the plurality of separate lanes.

18. The transmitter of claim 16 further adapted to select the nominal transfer unit size to be either the minimum transfer unit size or the maximum transfer unit size.

19. The transmitter of claim 16 further adapted to:
receive an indication that at least one of said plurality of lanes which lane(s) has experienced failure or degradation;
wherein the transmitter transmits the plurality of variable sized transfer units to the receiver only on working lanes of the plurality of separate lanes.

20. The transmitter of claim 19 further adapted to:
transmit an idle pattern on the at least one of said plurality of lanes which lane(s) has experienced failure or degradation to enable fault recovery detection at a receiver.

21. The transmitter according to claim 16, wherein each of the plurality of separate lanes carry respective signals that are of varying rates in relation to one another, and the transmitter is further adapted to adjust the respective varying rates to compensate for delay induced by the size of the packet.

22. The transmitter of claim 16, wherein the plurality of separate lanes comprising the composite medium each correspond to a respective plurality of frequency bands within a wideband of frequencies supported on a single optical fiber.

23. The transmitter of claim 16, wherein the plurality of separate lanes comprising the composite medium are supported by a plurality of frequency bands distributed throughout multiple optical fibers.

24. The transmitter of claim 16, wherein the plurality of separate lanes comprising the composite medium each carry respective signals that are at the same rate in relation to one another.

25. The transmitter of claim 16, wherein the plurality of separate lanes comprising the composite medium each carry respective signals that are at different rates in relation to one another.

\* \* \* \* \*